United States Patent
Lohman

(10) Patent No.: US 10,116,377 B2
(45) Date of Patent: Oct. 30, 2018

(54) DYNAMIC FORWARD ERROR CORRECTION BYPASS IN A DIGITAL COMMUNICATIONS SYSTEM

(71) Applicant: Google LLC, Mountain View, CA (US)

(72) Inventor: Michael Stephen Lohman, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 103 days.

(21) Appl. No.: 14/989,223

(22) Filed: Jan. 6, 2016

(65) Prior Publication Data

US 2017/0195037 A1  Jul. 6, 2017

(51) Int. Cl.
*H04B 7/185* (2006.01)
*H04L 1/00* (2006.01)

(52) U.S. Cl.
CPC ............ *H04B 7/185* (2013.01); *H04L 1/004* (2013.01)

(58) Field of Classification Search
CPC ..... H04L 1/0075; H04L 1/004; H04L 1/0042; H04L 1/0048; H04B 7/185; H04B 7/18502; H04B 7/18504; H04B 7/18513; H04B 7/18515
See application file for complete search history.

(56) References Cited

U.S. PATENT DOCUMENTS

| | | | |
|---|---|---|---|
| 8,897,770 B1 | 11/2014 | Frolov et al. | |
| 9,331,717 B2 * | 5/2016 | Duggan | H03M 13/3707 |
| 9,590,720 B2 * | 3/2017 | Jalali | H04B 7/18504 |
| 9,866,312 B2 * | 1/2018 | Jalali | H04B 7/18504 |
| 2007/0256001 A1 | 11/2007 | Suzuki et al. | |
| 2010/0223524 A1 * | 9/2010 | Duggan | H03M 13/3707 714/751 |
| 2011/0283156 A1 * | 11/2011 | Hiie | H04L 1/0076 714/746 |
| 2012/0226955 A1 | 9/2012 | Norair | |
| 2013/0070677 A1 * | 3/2013 | Chang | G01S 13/9303 370/328 |

(Continued)

FOREIGN PATENT DOCUMENTS

EP  1852986 A1  11/2007

OTHER PUBLICATIONS

International Search Report and Written Opinion for PCT Application No. PCT/US2016/065122, dated Mar. 20, 2017. 15 pages.

(Continued)

*Primary Examiner* — Ahmed Elallam
(74) *Attorney, Agent, or Firm* — Lerner, David, Littenberg, Krumholz & Mentlik, LLP

(57) ABSTRACT

A system and method of improving communications is provided. A gateway is communicatively coupled to an end terminal through an unmanned air vehicle (UAV), wherein a first link communicatively couples the gateway to the UAV, and a second link communicatively couples the UAV to the end terminal. At least one of the gateway and the UAV is configured to determine a signal quality on at least the first link between the gateway and the UAV in a first direction. If the signal quality exceeds a predetermined threshold, a received packet is encoded at the gateway for processing by the end terminal. The packet is further tagged with an indicator that the packet should bypass forward error correction (FEC) at the UAV.

20 Claims, 13 Drawing Sheets

(56) References Cited

U.S. PATENT DOCUMENTS

| | | | |
|---|---|---|---|
| 2013/0185614 A1* | 7/2013 | Shen | H04L 1/0046 |
| | | | 714/784 |
| 2014/0241195 A1 | 8/2014 | Fujita | |
| 2014/0313879 A1* | 10/2014 | Hiie | H04L 1/0076 |
| | | | 370/216 |
| 2016/0323066 A1* | 11/2016 | Duggan | H03M 13/3707 |
| 2017/0085411 A1* | 3/2017 | Noerpel | H04L 27/36 |
| 2017/0235316 A1* | 8/2017 | Shattil | G05D 1/104 |
| | | | 701/3 |

OTHER PUBLICATIONS

International Preliminary Report on Patentability for PCT Application No. PCT/US2016/065122, dated Jul. 19, 2018. 11 pages.

\* cited by examiner

Figure 1: Transmit Direction

Figure 2: Transmit Direction FEC Bypass

Figure 3: Transmit Direction Detailed Diagram

DYNAMIC FORWARD ERROR CORRECTION BYPASS IN A DIGITAL COMMUNICATIONS SYSTEM

BACKGROUND

In digital communications systems, such as those based on unmanned air vehicles (UAVs), the system may have greater capacity when less power is required by the digital payload. Moreover, a greater coverage area may be provided when less power is required. One of the greatest power consumers on the UAV is a receiver function of digital modems. A forward error correction (FEC) decode function block consumes a large amount of power. However, the FEC decode function block maintains the overall bit error rate (BER) and link performance.

A UAV supports user links, gateway links, and inter-UAV links. The FEC decoder is a large consumer of power for all of the wireless links. There is one FEC decoder allocated to each wireless link. There are a large number of user links since there is one user link for each user. There can be as many as 100s of active user links. There are typically a small number of gateway and inter-UAV links, on the order of 1 to 10.

BRIEF SUMMARY

One aspect of the disclosure provides a method of improving communications. The method includes receiving a first packet at a gateway communicatively coupled to an end terminal through a UAV, wherein a first wireless link communicatively couples the gateway to the UAV, and a second wireless link communicatively couples the UAV to the end terminal. A signal quality on at least the first link between the gateway and the UAV in a first direction is determined with one or more processors. If the signal quality exceeds a first predetermined threshold, the first received packet is encoded at the gateway for processing by the end terminal. Moreover, the first received packet is tagged with an indicator to bypass FEC at the UAV. In some examples, the method may further comprise receiving, at the gateway, a second packet from the UAV, the second packet originating from the end terminal, determining, with the one or more processors, whether the second packet was FEC decoded and encoded at the UAV, and if it is determined that the second packet was not FEC decoded and encoded at the UAV, decoding the second packet at the gateway using end terminal modem processing.

Another aspect of the disclosure provides a gateway. The gateway includes an interface adapted to be communicatively coupled with a UAV over a first link and with at least one end terminal over a second link between the UAV and the at least one end terminal. The gateway further includes at least one FEC encoder adapted to be interfaced with a backhaul and to receive a first packet from the backhaul, a formatting unit coupled to the FEC encoder, and a controller communicatively coupled to the at least one FEC encoder and the formatting unit. The controller is configured to determine whether the signal quality over the first link exceeds a first predetermined threshold. If the signal quality is determined to exceed the first predetermined threshold, the gateway switches from a first mode to a second mode. In the second mode, the at least one FEC encoder is configured to encode the received first packet for processing by the end terminal, and the formatting unit is configured to tag the received first packet with an indicator to bypass FEC at the UAV.

Yet another aspect of the disclosure provides a UAV, comprising a first interface adapted for receiving a first packet from a gateway communicatively coupled to the UAV via a first wireless link, and a second interface adapted for receiving a second packet from an end terminal communicatively coupled to the UAV via a second wireless link. The UAV further includes a FEC encoder coupled between the first interface and the second interface, a FEC decoder coupled between the first interface and the second interface, and a bypass link coupled between the first interface and the second interface and bypassing the FEC encoder and the FEC decoder. Moreover, the UAV includes a controller in communication with at least the first interface and the second interface, the controller configured to determine whether the first packet has been encoded for end terminal processing, and cause the first packet to be sent on the bypass link if it has been encoded for end terminal processing.

DETAILED DESCRIPTION

According to this disclosure, the FEC decoder function is dynamically removed from the UAV on all of the user links, gateway links, and inter-UAV links. Accordingly, power consumption in the UAV is significantly reduced. The dynamic removal of the FEC decoder function is based on instantaneous link quality, such as Bit Error Rate (BER) or Frame Error Rate (FER), and other parameters, such as available power and estimated future power consumption. When the wireless links in the UAV based system are very high quality, FEC decoders may be removed from the UAV with little to no impact on the overall Bit Error Rate. In some examples, depending on the link details, the FEC decoder function is moved from the UAV to a gateway terminal during high signal quality conditions. When signal quality is low, in order to achieve the highest radio link quality and lowest BER possible, the FEC decoders are not bypassed, thus providing the highest protection. It is anticipated that these events with low signal quality will be of short duration, thus the higher power required for this mode will only be over a short amount of time. A background power allocation algorithm is used to determine exactly when to operate in which mode. This background algorithm makes the trade-offs between acceptable BER rates, and power consumption, and anticipated usage for the next few hours, and thus anticipated power needs.

Figure 1:
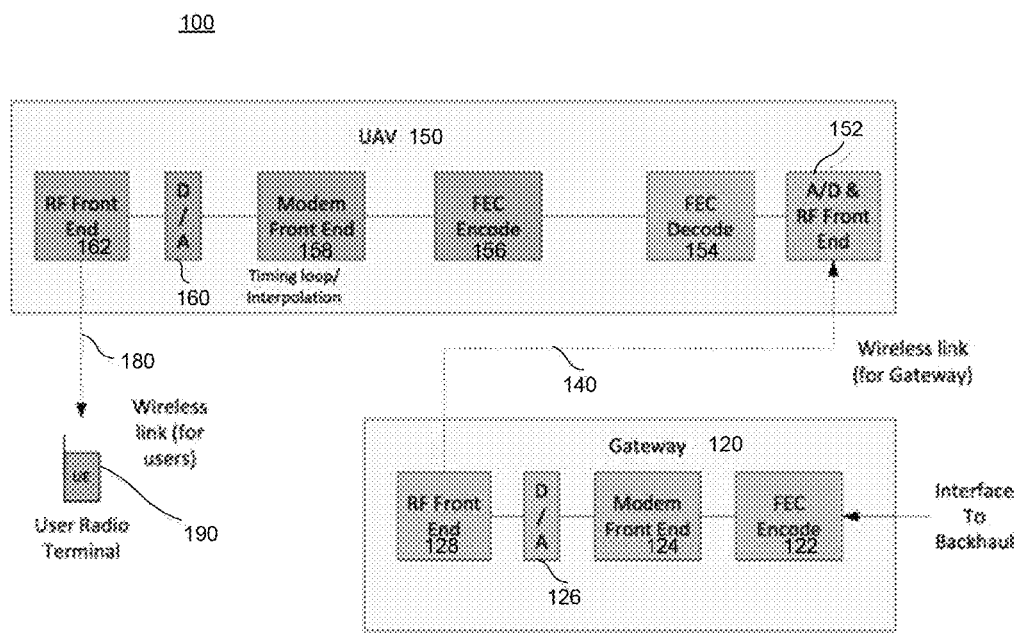
FIG. 1 is a block diagram of an example system transmitting in a first direction according to aspects of the disclosure.

FIG. 1 shows a "forward" data-path for a UAV system, where data is flowing from gateway terminal 120 towards an end user terminal 190 through UAV 150.

The gateway terminal 120 may reside on, near, or under ground. The gateway terminal 120 includes, for example, FEC encoder 122, modem front end unit 124, digital to analog (D/A) converter 126, and radio frequency (RF) front end unit 128. As shown, the gateway terminal 120 has a backhaul connection to the Internet. For example, a fiber optic connection may be established between the gateway terminal 120 and an Internet access point. Data from the Internet enters the gateway terminal 120 and then goes to FEC encoder 122.

Data is transmitted from the gateway terminal 120 to the UAV 150 via wireless gateway link 140. The UAV 150 includes, for example, analog to digital (A/D) converter and RF front end unit 152 which receives data transmissions from the gateway terminal 120 over the wireless gateway link 140. The UAV 150 may further include FEC decoder 154 and FEC encoder 156, which may be selectively utilized based on, for example, a quality of the signal between the gateway terminal 120 and the UAV 150, as discussed further below. The UAV 150 further includes modem front end 158, D/A converter 160, and RF front end 162. The RF front end 162 may be an interface used for transmitting data from the UAV 150 to the user terminal 190 over wireless user link 180.

Some components of the UAV 150 perform tasks which are part of gateway link modem/FEC format processing. For example, A/D and RF front end unit 152 and FEC decoder 154, we well as each of the components 122-128 of the gateway terminal, perform gateway link modem/FEC format processing. Other components of the UAB 150, such as components 156-162, and user terminal 190 perform tasks which are part of user equipment (UE) modem/FEC format processing.

The UAV 150 may be, for example, a satellite, a solar cell tower, an aircraft, or any other type of air vehicle containing communications equipment. While the gateway terminal 120 is fixed in position, the UAV 150 may be moving around in the air. Accordingly, at some times a line of site between the gateway terminal 120 and the UAV 150 will be less obstructed than at other times. Changes in line of sight and other conditions, such as weather, may affect a signal quality of data transmissions over the wireless gateway link 140.

The user terminal 190 may be, for example, a full-sized personal computer, or a mobile device capable of wirelessly exchanging data with the UAV 150. By way of example only, user terminal 190 may be a satellite phone, a wireless-enabled PDA, a cellular phone capable of obtaining information via the Internet, etc. The user terminal 190 may also move about. At some times, for example, the user terminal 190 may be outside under a clear sky, and have a direct high quality wireless connection with the UAV 150. In other examples, however, the line of sight between the user terminal 190 and the UAV 150 may be obstructed, for example, by buildings, trees, other structures, clouds, rain, or other weather conditions. Accordingly, a quality of signals transmitted between the UAV 150 and the user terminal 190 may be lower.

Packets transmitted between the gateway terminal 120 and the user terminal 190 through the UAV 150 may be handled differently based on signal quality. In determining signal quality, an aggregate quality over all links may be considered. For example, an aggregate bit error rate of signals over gateway link 140 and also of signals over user link 180 may be computed. The signal quality may also be determined in both transmit directions—from the gateway 120 to the user terminal 190, and also from the user terminal 190 to the gateway 120. In other examples, the error rate of only some links and/or in only one direction may be considered.

When signal quality is relatively high, such as above a predetermined threshold, the UAV FEC decoder 154 and FEC encoder 156 may be bypassed. Accordingly, packets encoded by the gateway FEC encoder 122 are provided to the end user terminal 190, where they may be decoded. Bypassing the FEC decoding/encoding in the UAV 150 may significantly reduce power consumed by the UAV 150. Because signal quality is high, the bit error rate (BER) is low, and thus bypassing FEC decoding and encoding in the UAV 150 will not significantly impact signal quality. When quality of signals between the gateway terminal 120 and the UAV 150 is relatively low, such as below the predetermined threshold, FEC decoding and encoding in the UAV 150 may be performed, thereby maintaining a reduced BER. The determination of whether or not to bypass the FEC decoding/encoding in the UAV 150 may be made dynamically by, for example, a controller (not shown) in the gateway terminal 120 or the UAV 150.

Figure 2:
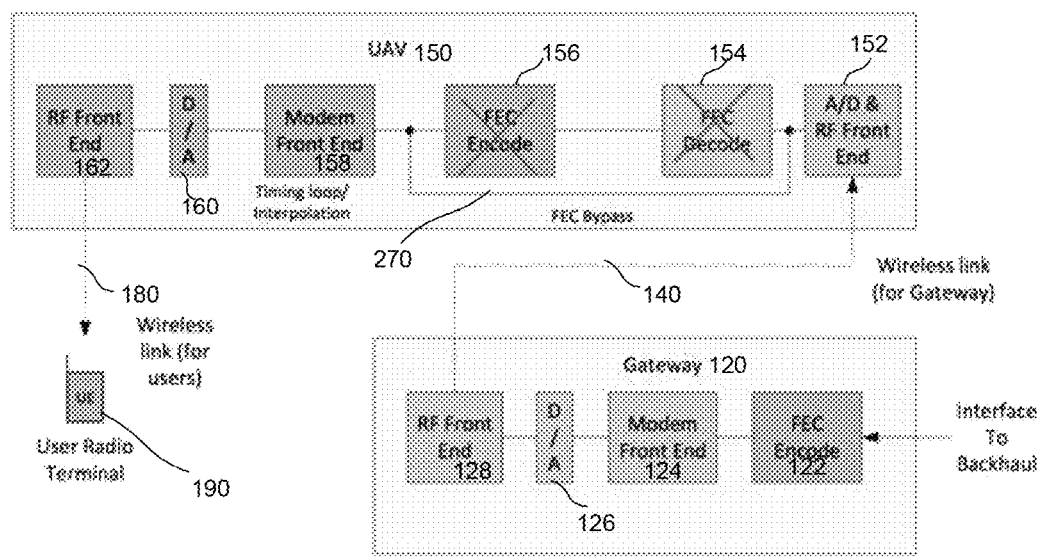
FIG. 2 is a block diagram of another example system transmitting in the first direction according to aspects of the disclosure.

FIG. 2 illustrates the aforementioned bypass of the FEC decoding/encoding in the UAV 150. Under good signal quality conditions, the FEC Encoder 122 does not perform forward error correction over gateway link 140, but rather performs forward error correction for user link 180. According to the example shown in FIG. 2, The UAV sends the packets along FEC bypass link 270 when good signal quality conditions are present. According to other examples, the packets may be transmitted through the FEC decoder 154 and FEC encoder 156 without being processed. When good signal quality conditions are present, the BERs on the forward path from the gateway terminal 120 to the UAV will be very low, but not necessarily zero. The BER may be low enough that an FEC decoder in the user terminal 190 will correct the errors with no significant impact on the end-to-end BER. The FECs for each type of link can be completely different or exactly identical, and can still be supported by the system 100. Also, in some examples, the forward FEC encoding function may be performed in a ground switching center, such as in the cloud.

Packets encoded by the FEC encoder 122 for the user link 180 may be formatted and tagged so the UAV 150 knows that it should bypass FEC decoder 154 on the gateway link 140, as well as FEC encoder 156 towards the user link 180. The tag may be, for example, a small header for each frame. This tag may be protected, for example, with parity bits or a small FEC block. The tag indicates to bypass the FEC decode/encode blocks and indicates on which user link to transmit. For example, the tag may specify a particular beam, frequency, and timeslot on which to transmit the accompanying packet. While in some examples each FEC block will require a tag, in other examples a set of FEC blocks together could require one longer tag for more efficient FEC. In some cases, the tag will serve as an index to a table that identifies the particular beam, frequency and timeslot, so as to minimize the size of the tag.

Figure 3:
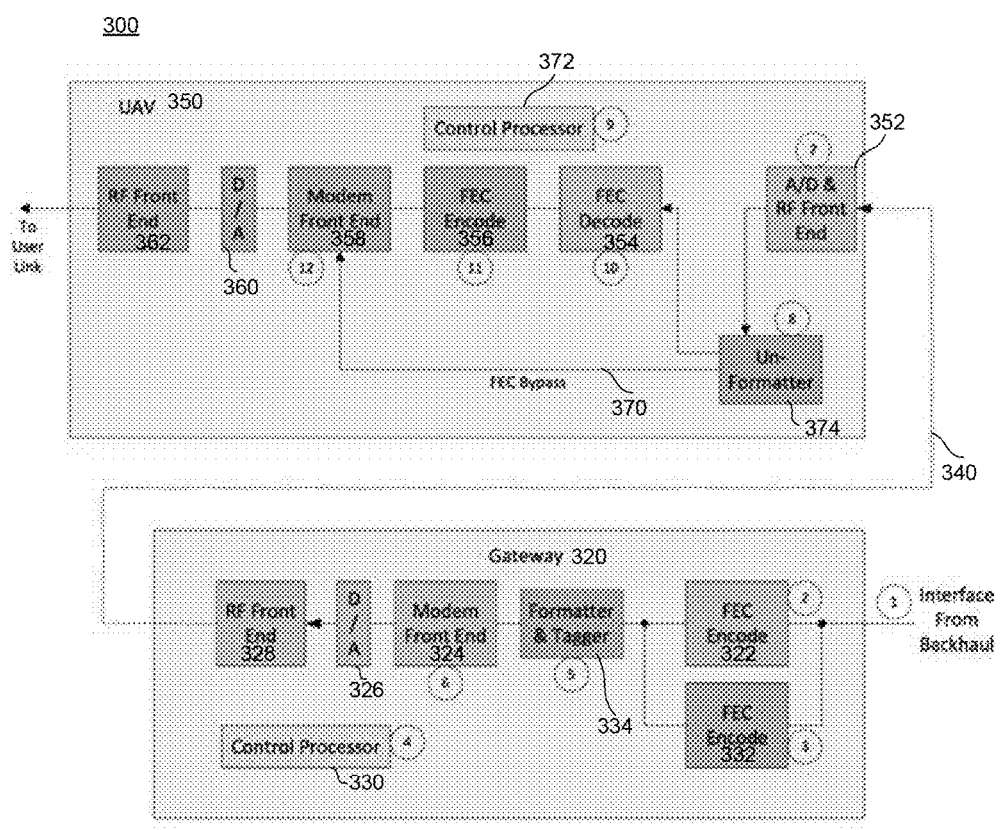
FIG. 3 is a block diagram of another example system transmitting in the first direction according to aspects of the disclosure.

FIG. 3 provides a more detailed illustration of the forward or transmit path through a system 300. As shown, gateway terminal 320 includes FEC encoder 322, modem front end 324, D/A converter 326, and RF front end 328, similar to the description of gateway terminal 120 above. Also shown in FIG. 3, gateway terminal 320 includes a second FEC encoder 332 and a formatter and tagger 334 performing UE modem/FEC format processing. When signal quality between the gateway 320 and UAV 350 is high, the FEC encoder 332 may be utilized to encode packets for an end user link, and formatter and tagger 334 may configure the packet to include an indication that FEC decoding/encoding should be bypassed.

The gateway terminal 320 also includes gateway controller 330. The gateway controller 330 may determine the quality of the signal between the gateway 320 and the UAV 350. For example, the gateway controller may periodically or continually monitor a BER of packets sent over gateway link 340. The packets used to make this determination may be actual data packets or test packets. In some examples, information received back from the UAV 350 may be used in determining the quality of signals over the link 340. For example, UAV controller 372 or other components of the UAV 350 may provide signal quality information, such as error rate, etc., to the gateway controller 330.

Once a packet received from backhaul is encoded, either by first FEC encoder 322 or by second FEC encoder 332, the packet is sent through the gateway 320 to the UAV 350 over gateway link 340. The packet is received at A/D and RF front end unit 352, and then provided to un-formatter 374. The un-formatter 372 may be, for example, additional hardware configured to handle different formats of packets for different processing. The un-formatter, in communication with UAV controller 372, may determine whether the packet was formatted for the gateway link modem by the first FEC encoder 322 or for UE modem by the second FEC encoder 332. For example, the un-formatter 374 may identify how the packet was formatted based on information in the packet header, such as tags or user link information.

If signal quality is low, and the first FEC encoder 322 encoded the packet with gateway link modem/FEE format processing, the un-formatter sends the packet to FEC decoder 354 for regular FEC decoding, and FEC encoding with UE modem/FEC format processing at FEC encoder 356. However, where signal quality is high and the second FEC encoder 332 in the gateway 320 encoded the packet with UE modem/FEC format processing, the un-formatter 374 sends the packet over bypass link 370 directly to modem front end 358. From the modem front end 358, all packets are sent to the D/A converter 360 and the RF front end 362 for transmission to a particular user device.

Figure 4:
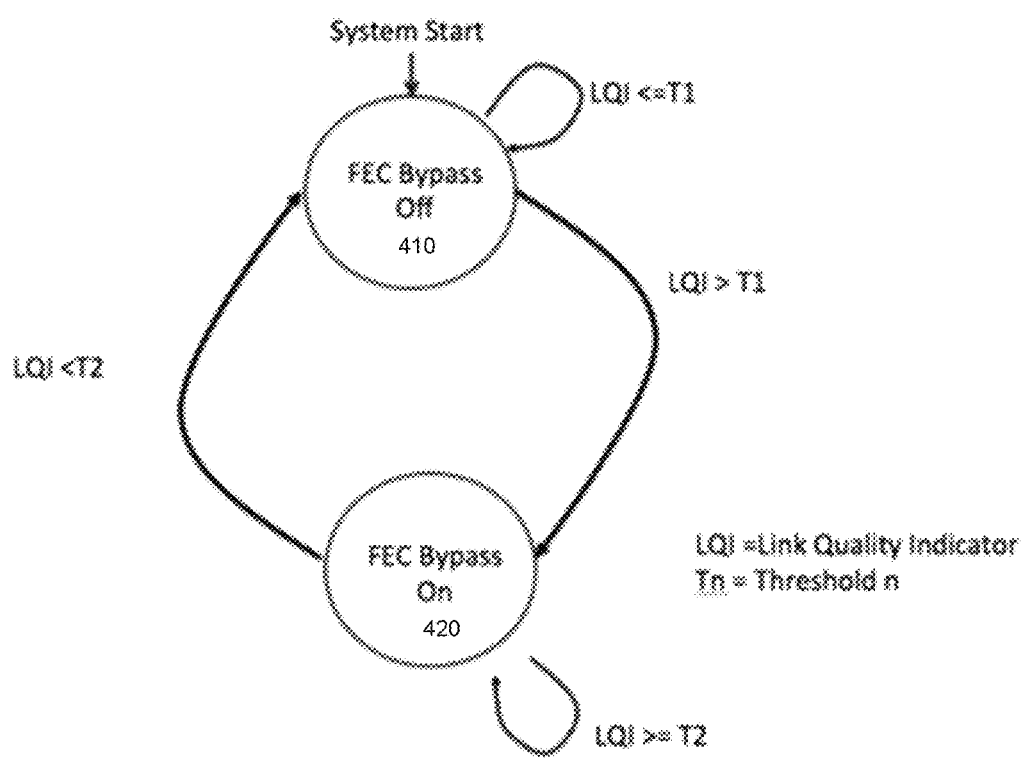
FIG. 4 is a flow diagram of a transition between modes according to aspects of the disclosure.

FIG. 4 is an example state machine illustrating a determination whether to turn FEC bypassing on or off. In initial state 410, FEC bypass may be off. In some examples this initial state 410 may also serve as the default state. The system remains in this state for several seconds and then starts monitoring link quality indicator (LQI).

In this example, LQI is computed as a function of signal strength, frame error rate, and bit error rate. In other examples, only some of these factors, or other factors, may be considered. The LQI in this example is computed based on a combination of the gateway link 140 (FIG. 1) and the user link 180 (FIG. 1). For example, the FEC decoder 154 (FIG. 1) in the UAV 150 reports on the gateway link 140 channel quality, including signal strength, FER, and BER. The FEC decoder in the UE (not shown) reports the user link 180 channel quality. The reports may be sent to one or both of the UAV controller 372 (FIG. 3) and the gateway controller 330 (FIG. 3) for continued monitoring of the LQI.

As long as the LQI is below a threshold T1, the FEC bypass remains off. However, as soon as the LQI improves above T1, then the FEC Bypass mode is turned on and the state changes to FEC Bypass On state 420.

In the FEC Bypass On mode 420, the state stays the same, as long as the LQI is greater than or equal to Threshold 2 (T2). T2 may be slightly lower than T1. This may minimize a ping-pong effect, where the state rapidly flips based on only very small changes in LQI right at the threshold.

Once the LQI drops below T2, the state goes back to FEC Bypass Off mode 410. Once the FEC Bypass Off state is reached again, it stays in this mode for a certain time period, on the order of a few seconds to minutes, before monitoring the LQI again. This delay in monitoring the LQI may ensure that in rapidly varying LQI conditions, the FEC Bypass state stays in the Off state.

Since this system is a 2-way communications system, the FEC Bypass determination may be made independently for each direction. In other examples, the determination could be made for one direction with the assumption that both directions will have essentially equal or similar link quality conditions, and thus only one direction needs to be monitored for both directions.

In addition, the communications system may support multiple beams, multiple frequencies, or multiple users. As such, the system may have one of these FEC Bypass state machines for the entire system, or may have one state machine for each beam, or frequency, or user. Moreover, the communications system may support different logical channels or timeslots on the same frequency. Again one of these state machines may be implemented for each logical channel or timeslot, or may be implemented for the entire channel as a whole.

While in the example above the determination of whether to turn FEC Bypass mode on or off is based on a computed LSI as compared to a threshold, in other examples the determination may be based on other factors. For example, the determination may be based upon weather data. In such an example, a unit in the gateway or UAV may detect weather conditions. In clear skies FEC may be bypassed in the UAV, while in any other condition regular FEC decoding/encoding may be performed by the UAV.

In some examples, even during periods of high quality signal conditions, the system may periodically switch the FEC bypass mode to off. In this regard, the system may collect statistics, verify accurate functioning, or perform other tasks. The periodic switching off of the FEC bypass mode could be for 1 frame per N frames where N is around 100 or so, or this could be for a few seconds every few minutes, or for any other frequency.

Figure 5:
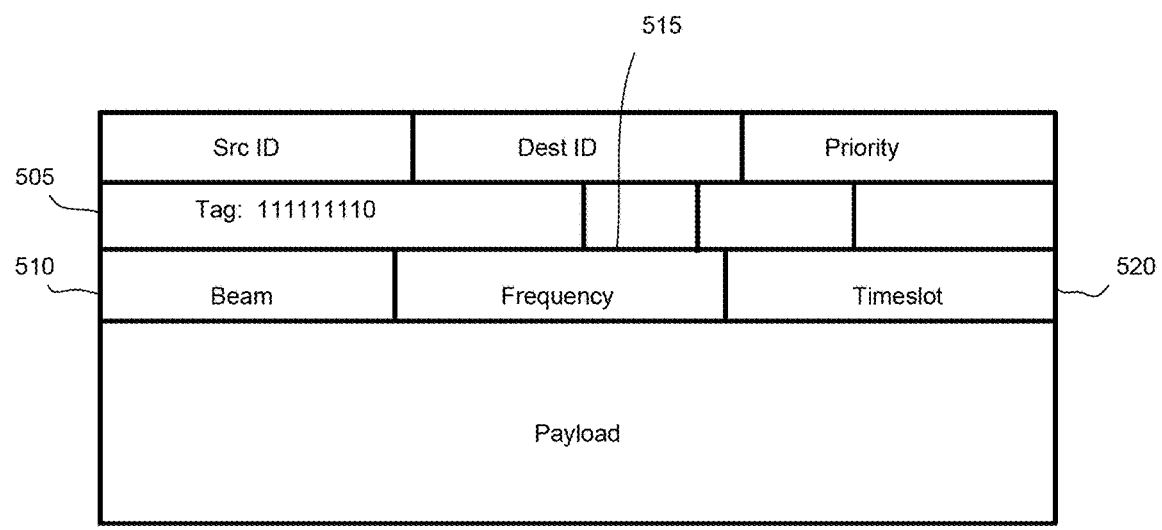
FIG. 5 illustrates an example packet format according to aspects of the disclosure.

FIG. 5 illustrates an example packet formatted for FEC bypass, for example by the second FEC encoder 332 (FIG. 3). In this example, the packet includes a header identifying information such as source identifier, destination identifier, priority, or any other information depending on a type of packet or protocol. The second FEC encoder may add information to the header, such as a tag 505. The tag 505 may be, for example, a binary representation having any length. According to some examples, the tag is protected by parity bits or a code block to ensure proper handling by recipients of the packet. The header may also identify information regarding a specific user link. For example, a beam, frequency, and timeslot may be specified in fields 510, 515, 520, respectively. Or alternatively, the header may have a tag that is an index to a lookup table that contains the destination information such as beam number, channel number, timeslot, and user number.

Figure 6:
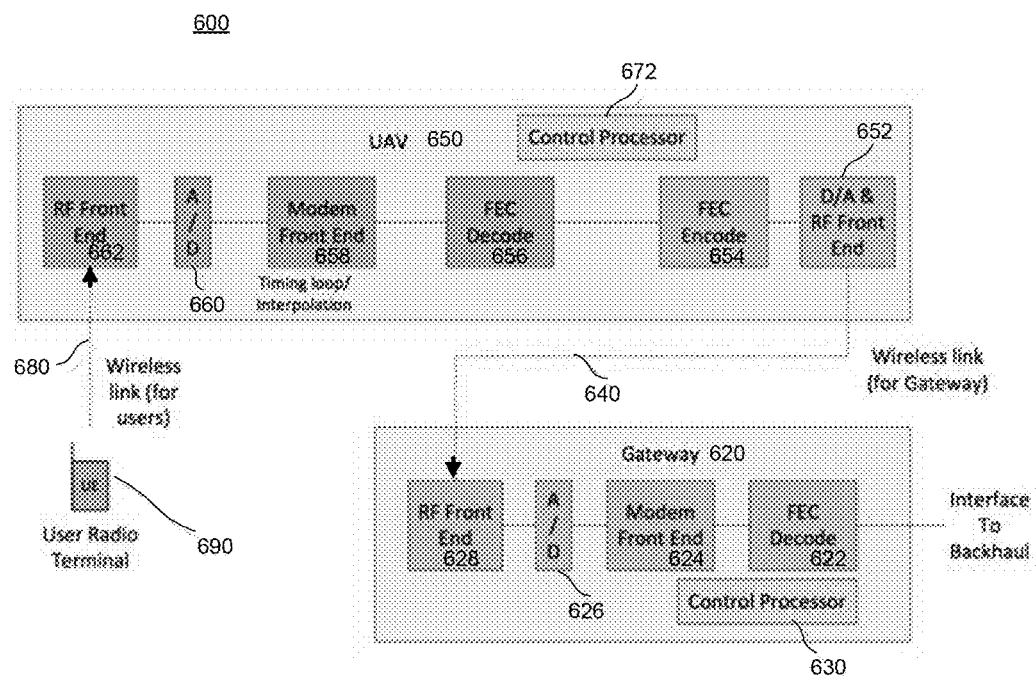
FIG. 6 is a block diagram of an example system transmitting in a second direction according to aspects of the disclosure.

FIG. 6 illustrates transmission of data through system 600 in a return or receive direction. In the return direction, packets are sent from user terminal 690 back towards UAV 650, gateway 620 and Internet. While only one FEC decoder 656 is shown in the UAV 650 in FIG. 6, the UAV 650 may have a large number of FEC decoders to support a large number of users. These FEC decoders can dynamically be moved from the UAV 650 to the gateway terminal 620 or even further back in the network, such as at a ground switching center, for example, on a cloud processor. These FEC decoders would be moved on a per user basis, when the user signal is of high quality. When the FEC decoders are moved to the ground, the FEC encoder 656 on the UAV 650 towards the gateway terminal 620 is bypassed.

Figure 7:
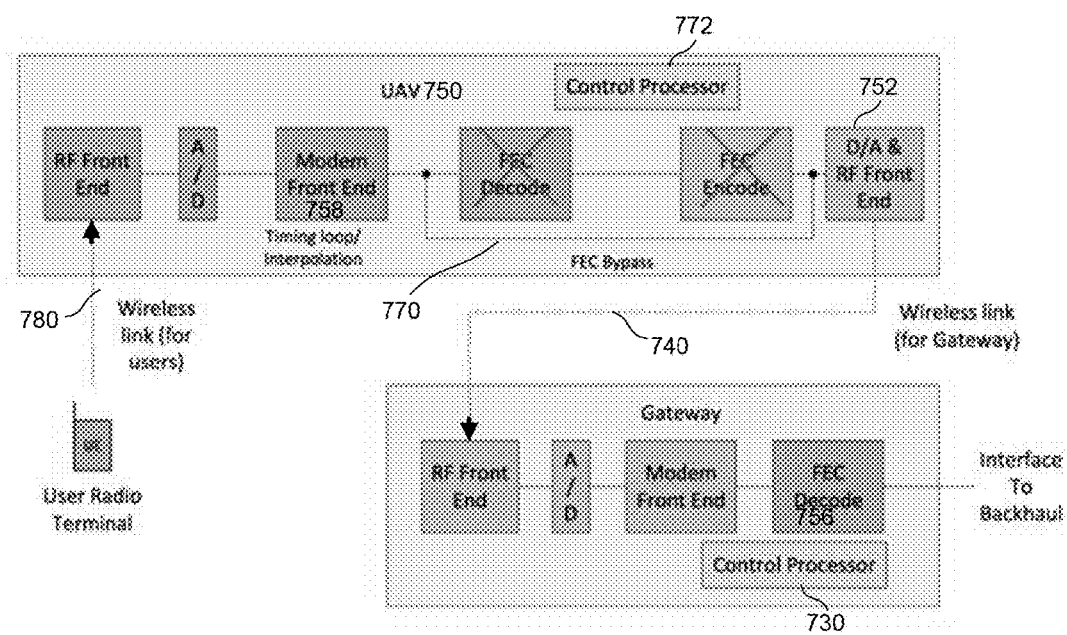
FIG. 7 is a block diagram of another example system transmitting in the second direction according to aspects of the disclosure.

FIG. 7 illustrates an example where the FEC decoder 656 is moved to the gateway 620, and bypassed on the UAV 650. UAV controller 772 may be in frequent or continual communication with gateway controller 730. One or both of the UAV controller 772 and the gateway controller 730 may monitor signal quality on one or both of user link 780 and gateway link 740, and determine, for example, whether the signal quality meets or exceeds a predetermined threshold. If the threshold is met, as packets are received at the UAV 650 from the end terminal 690, the packets may be directed through modem front end 758 directly to D/A and RF front end 752, bypassing FEC decoder/encoder. For example, the UAV controller 772 may instruct the modem front end 758 to send the packets over FEC bypass link 770. The FEC decoding may instead be performed at the gateway 720 by FEC decoder 756.

Figure 8:
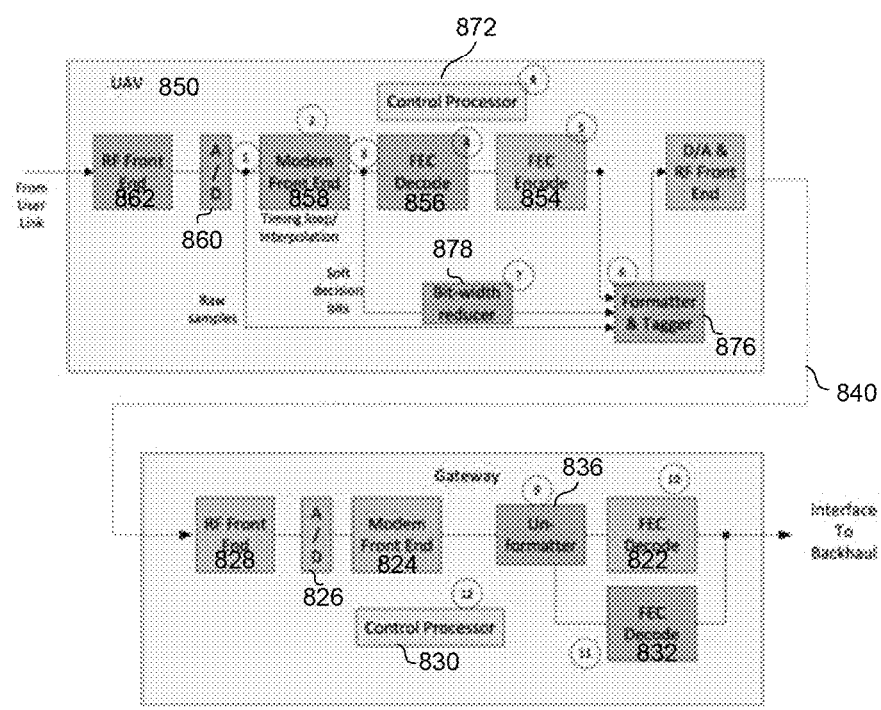
FIG. 8 is a block diagram of another example system transmitting in the second direction according to aspects of the disclosure.

FIG. 8 illustrates a detailed example of receive direction FEC bypass in a system 800, implementing an additional power savings technique in the return direction. Packets received at the UAV 850 pass through RF front end 862 and A/D converter 860. Raw I/Q samples are then sent from the A/D converter 860 to formatter and tagger unit 876. This not only bypasses the FEC decoder/encoder, but will also bypass the modem as well. In a typical system, the raw IQ samples are sent to the modem where they are demodulated into soft decision bits, and then those soft decision bits are sent to the FEC decoder. In the present example, the header/tag of the packet is still decoded, and the data section of the packet is left as raw I/Q samples. The benefit of this mode is that it allows for optimal decoder operation at the end user station in the forward direction, and at the gateway terminal in the return direction, since minimal information is lost due to quantizing the raw I/Q samples. However, as this technique requires more bandwidth, it is most useful when the overall system demand is well below the capacity of the link.

According to another example, instead of sending "hard decision" bits out of the modem front end 858, "soft decision" bits may be sent. The "soft decision" bits may be of variable length, depending on the signal quality. Accordingly, the soft decision bits may be provided to bit-width reducer 878, which may reduce a width of the soft decision bits to a predetermined width. Note that the soft decision bits are different then the raw IQ samples, because they have been demodulated by the modem. For the software decision bits, the greater the bit width, the less information is lost due to quantization, however, the more capacity and thus power is required. So the bit-width reducer is continually trying to minimize the bit width, and still maintain minimal quantization error to minimize the BER. For very high signal quality, and low order modulation, only a small number of bits are required, such as 6 bits. For slightly lower signal quality cases, more bits are required, such as 12 to 16 bits.

Using soft decision bits increases the required capacity of the link 840 down to the gateway 820. Accordingly, soft decision bits may be used only during low capacity times. For example, the controller 872 may monitor a capacity of the gateway link 840. If the capacity is above a predetermined threshold, the soft decision bits may be used. Otherwise, hard decision bits may be used.

Figure 9:
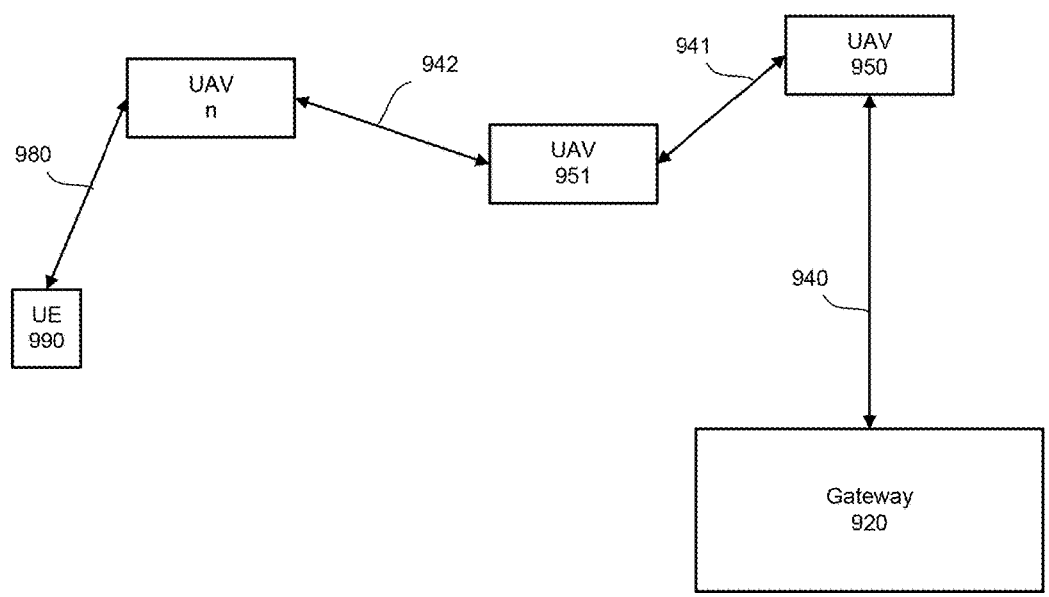
FIG. 9 is a block diagram of an example system including inter-vehicle links according to aspects of the disclosure.

FIG. 9 illustrates an example using Inter-Vehicle-Links (IVLs). As shown, gateway 920 is wirelessly coupled to UAV 950, which is further coupled to UAV 951 and UAV n. UAV n is wirelessly coupled to user equipment (UE) 990. The power saving techniques described above may be used at each hop. For example, if an aggregate LQI computed for all links 940, 941, 942, 980 is above a predetermined threshold, each IVL 940, 941, 942, 980 can forward data with or without going through the decode/encode functions in the UAVs 950, 951, n.

Figure 10:
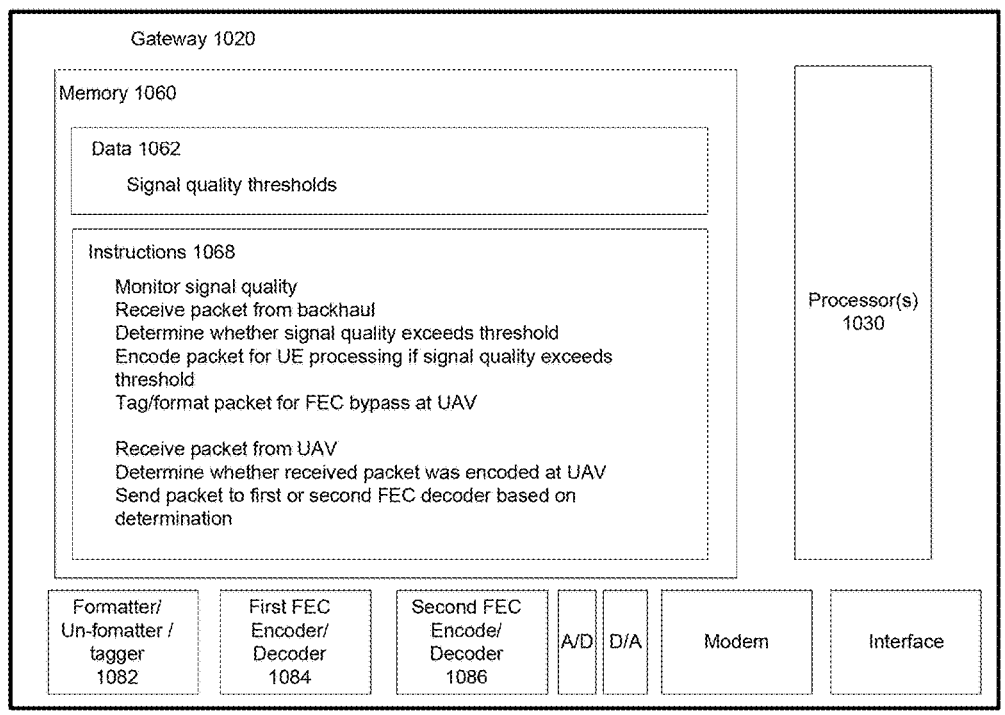
FIG. 10 is a block diagram of an example gateway terminal according to aspects of the disclosure.

FIG. 10 illustrates an example gateway terminal 1020. The gateway terminal 1020 may be communicatively coupled between a network, such as the Internet, and a UAV or other communication device having power constraints. The UAV may be further coupled to one or more end terminal devices, such as mobile phones, tablets, laptops, or any other mobile computing device.

As shown in FIG. 10, the gateway terminal 1020 can contain one or more processors 1030, memory 1060 and other components typically present in gateway terminals, such as interfaces, modems, A/D and D/A converters, etc. The gateway terminal 1020 may further include other components, such as a formatter/un-formatter/tagger unit 1082, a first FEC encoder/decoder 1084, and a second FEC encoder/decoder 1086. The first FEC encoder/decoder 1084 may, for example, be used for regular modem processing. The second FEC encoder/decoder 1086 may be used, for example, for end terminal processing where FEC is bypassed in the UAV.

The memory can be of any non-transitory type capable of storing information accessible by the processor, such as a hard-drive, memory card, RAM, DVD, write-capable, etc. The memory 1060 can store information accessible by the one or more processors 1030, including instructions 1068 that can be executed by the one or more processors 1030. Memory 1060 can also include data 1062 that can be retrieved, manipulated or stored by the processor 1030.

The instructions 1068 can be any set of instructions to be executed directly, such as machine code, or indirectly, such as scripts, by the one or more processors. In that regard, the terms "instructions," "applications," "steps" and "programs" can be used interchangeably herein. The instructions can be stored in object code format for direct processing by a processor, or in any other computing device language including scripts or collections of independent source code modules that are interpreted on demand or compiled in advance.

Data 1062 can be retrieved, stored or modified by the one or more processors 1030 in accordance with the instructions 1068. In one example, the data 1062 may include at least one predetermined signal quality threshold. The signal quality threshold may be based on BER, signal strength, or any combination of these or other quantifiers. For example, the threshold may be a BER of $10^{-6}$.

In accordance with the instructions 1068, the gateway 1020 may determine whether the links connecting the gateway 1020 to the end terminal are transmitting at high signal quality. For example, during bad weather some links may experience an increased error rate. Where signal quality of the links is high, the gateway 1020 may execute instructions, using the processor 130, to encode packets for processing by the end terminal and format/tag packets for FEC bypass in the UAV. In a reverse direction, the instructions 1068 may be executed by the processor 1030 to determine whether a packet received from the UAV had bypassed FEC in the UAV, and thus whether the packet should be sent to the first FEC encoder/decoder 1084 or the second FEC encoder/decoder 1086.

Although the subject matter described herein is not limited by any particular data structure, the data 1062 can be stored in internal or external memory, computer registers, in a relational database as a table having many different fields and records, or XML documents. The data 1062 can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 1030 can be any conventional processors, such as commercially available CPUs. Alternatively, the processors can be dedicated components such as an application specific integrated circuit ("ASIC") or other hardware-based processor. Although not necessary, the processors 1030 may include specialized hardware components to perform specific computing processes.

Although FIG. 10 functionally illustrates the processor, memory, and other elements of gateway terminal 1020 as being within the same block, the processor, computer, computing device, or memory can actually comprise multiple processors, computers, computing devices, or memories that may or may not be stored within the same physical housing. For example, the memory can be a hard drive or other storage media located in housings different from that of the gateway terminal 1020. Accordingly, references to a processor, computer, computing device, or memory will be understood to include references to a collection of processors, computers, computing devices, or memories that may or may not operate in parallel. For example, the gateway terminal 1020 may include load-balanced computing devices, a distributed system, etc. Yet further, although some functions described below are indicated as taking place on a single computing device having a single processor, various aspects of the subject matter described herein can be implemented by a plurality of computing devices, for example, communicating information over a network.

Figure 11:
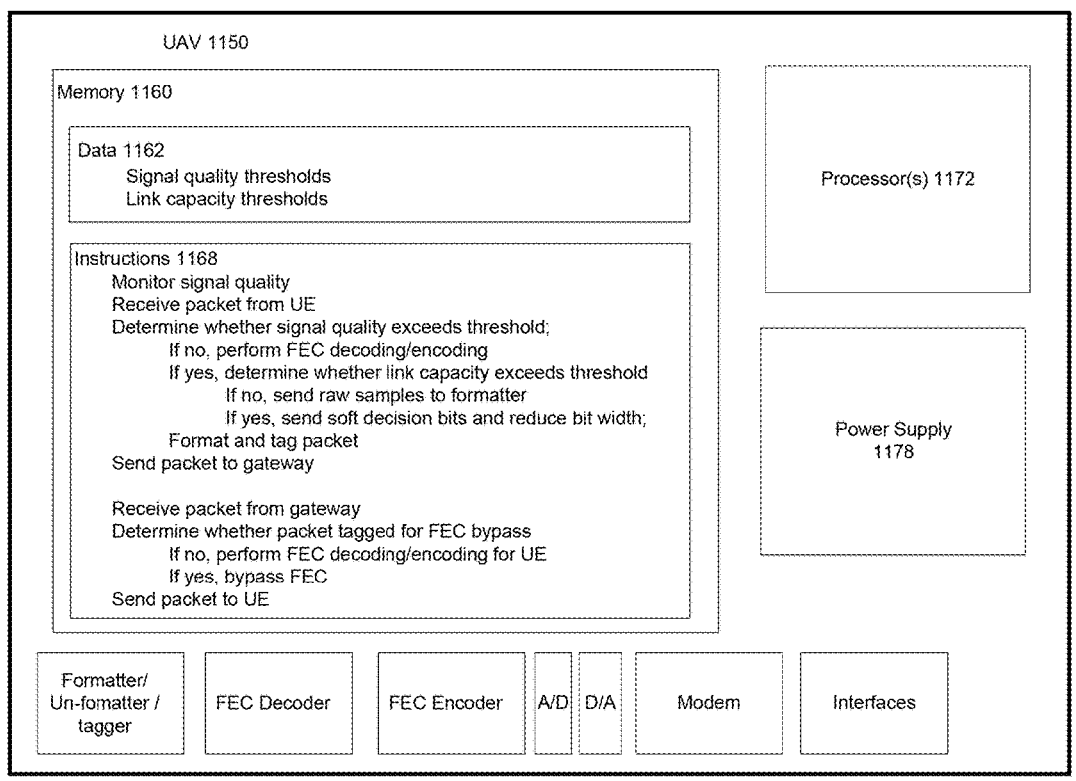
FIG. 11 is a block diagram of an example UAV according to aspects of the disclosure.

FIG. 11 illustrates an example UAV 1150. Similar to the gateway terminal, the UAV 1150 may include a memory 1160 including data 1162 and instructions 1168, and one or more processors 1172 in communication with the memory 1160 and other components. The memory 1160 and processors 1172 may be any of a variety of types, similar to the memory 1060 and processors 1030 described above in connection with FIG. 10.

The UAV 1150 also include power supply 1178, such as a battery. The instructions 1168, when executed by the processors 1172, may help reduce drain on the power supply 1178. For example, for packets received from a user end terminal, the UAV 1150 determines whether a signal quality of its links to coupled devices meets or exceeds a predetermined threshold. It may further determine whether link capacity exceeds a threshold. If both of these are true, the UAV 1150 sends soft decision bits having a reduced width from its modem to its formatter, bypassing FEC encoding/decoding. Bypassing the FEC encoding/decoding reduces a drain on the power supply 1178 that would typically result from performing the FEC encoding/decoding at the UAV. Instead, FEC decoding is moved to the gateway terminal, where power resources are better available. When packets are received from the gateway terminal and destined for an end terminal, the UAV 1150 determines whether the packets are tagged for FEC bypass, and send the packets accordingly.

In addition to the foregoing, methods according to the present disclosure are now described. While operations of the methods are described in a particular order, it should be understood that the order of operations may be varied. Some operations may be performed simultaneously. Additionally, operations may be added or omitted.

Figure 12:
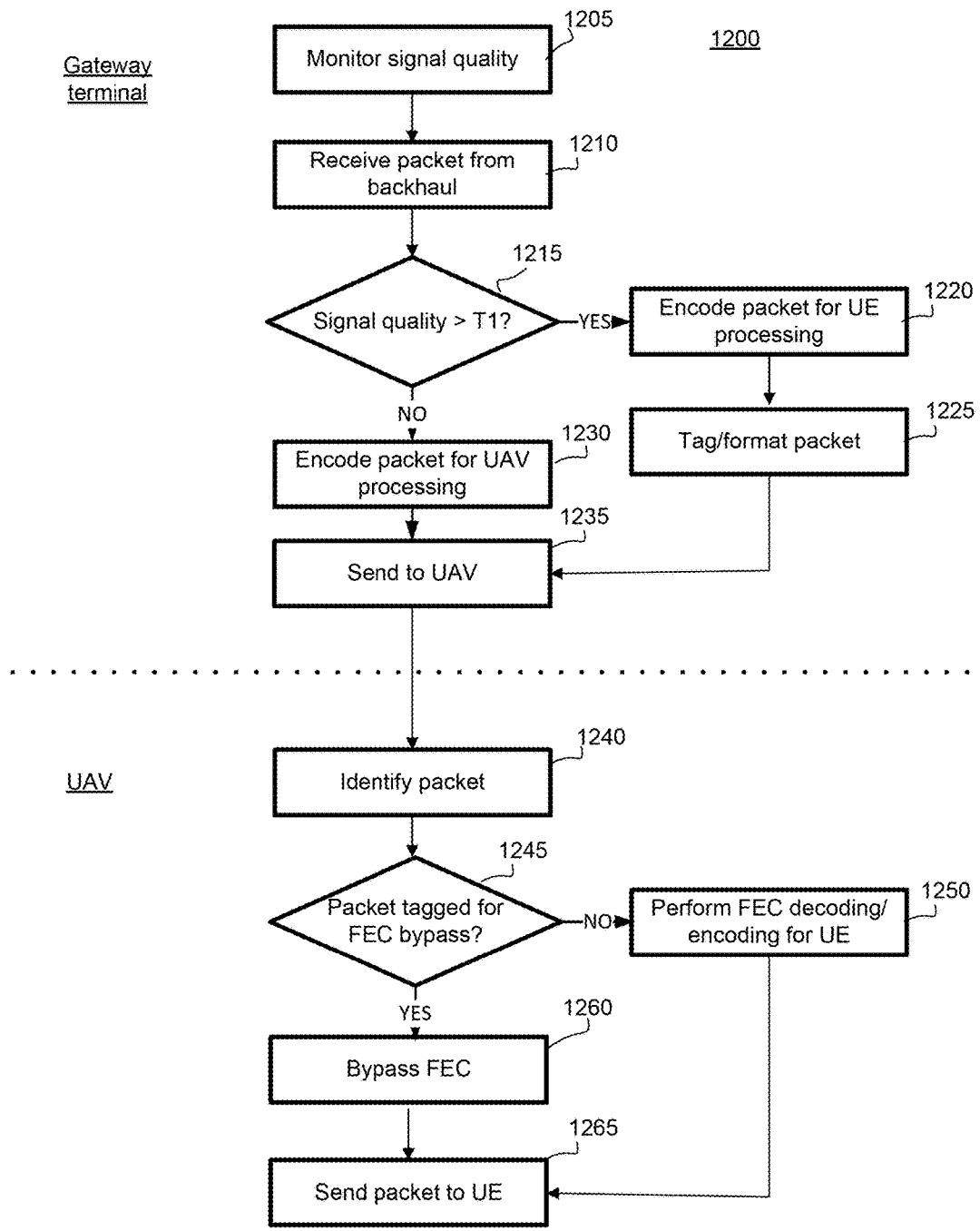
FIG. 12 is a flow diagram illustrating an example method of FEC bypass in a transmit direction according to aspects of the disclosure.

FIG. 12 illustrates an example flow diagram of a method 1200 of transmitting packets in a forward direction. In block 1205, the gateway terminal monitors signal quality of one or more links. For example, all links between the gateway, UAV, and end terminal may be monitored. In other examples, only particular links may be monitored. The monitoring may be performed continually, periodically, or in response to a predetermined event. For example, when the system is initialized, it may wait a few seconds or minute before beginning monitoring every few seconds, and send packets for regular processing during that wait time. In other examples, the monitoring may be performed in response to receipt of one or more packets. In performing the monitoring, the gateway terminal may receive information from the UAV, which may also perform monitoring, or from any other coupled device.

In block 1210, the gateway terminal receives a packet from a backhaul, which may be coupled to the gateway by optical fiber or other links. The packet may be formatted and sent using any of a variety of protocols.

In block 1215, it is determined whether the signal quality being monitored exceeds the predetermined threshold. If not, the packet is encoded for regular UAV processing (block 1230), including FEC encoding/decoding in the UAV.

If the signal quality does exceed the threshold, however, the packet is encoded for the link between the UAV and the end terminal (block 1220), such that it may be decoded directly by the end terminal. The encoded packet is tagged and formatted (block 1225) to identify how it should be handled by the UAV. For example, one or more flags in a header of the packet may be set to indicate that FEC should be bypassed in the UAV. Moreover, a particular user link over which the packet should be sent by the UAV may also be indicated in the packet header.

However, regardless of whether the packet is encoded at the gateway, it is sent to the UAV in block 1235. In block 1240, the UAV receives and identifies the packet. The UAV determined (block 1245) based on the identification whether the packet is tagged for FEC bypass. If so, the UAV bypasses FEC (block 1260), for example by sending the packet on a link that bypasses an FEC encoder and decoder in the UAV.

If it is determined in block 1245 that the packet is not tagged for FEC bypass, regular FEC decoding and encoding for the end terminal link may be performed at the UAV.

Regardless of how the packet is processed at the UAV, it is sent to the UE in block 1265.

Figure 13:
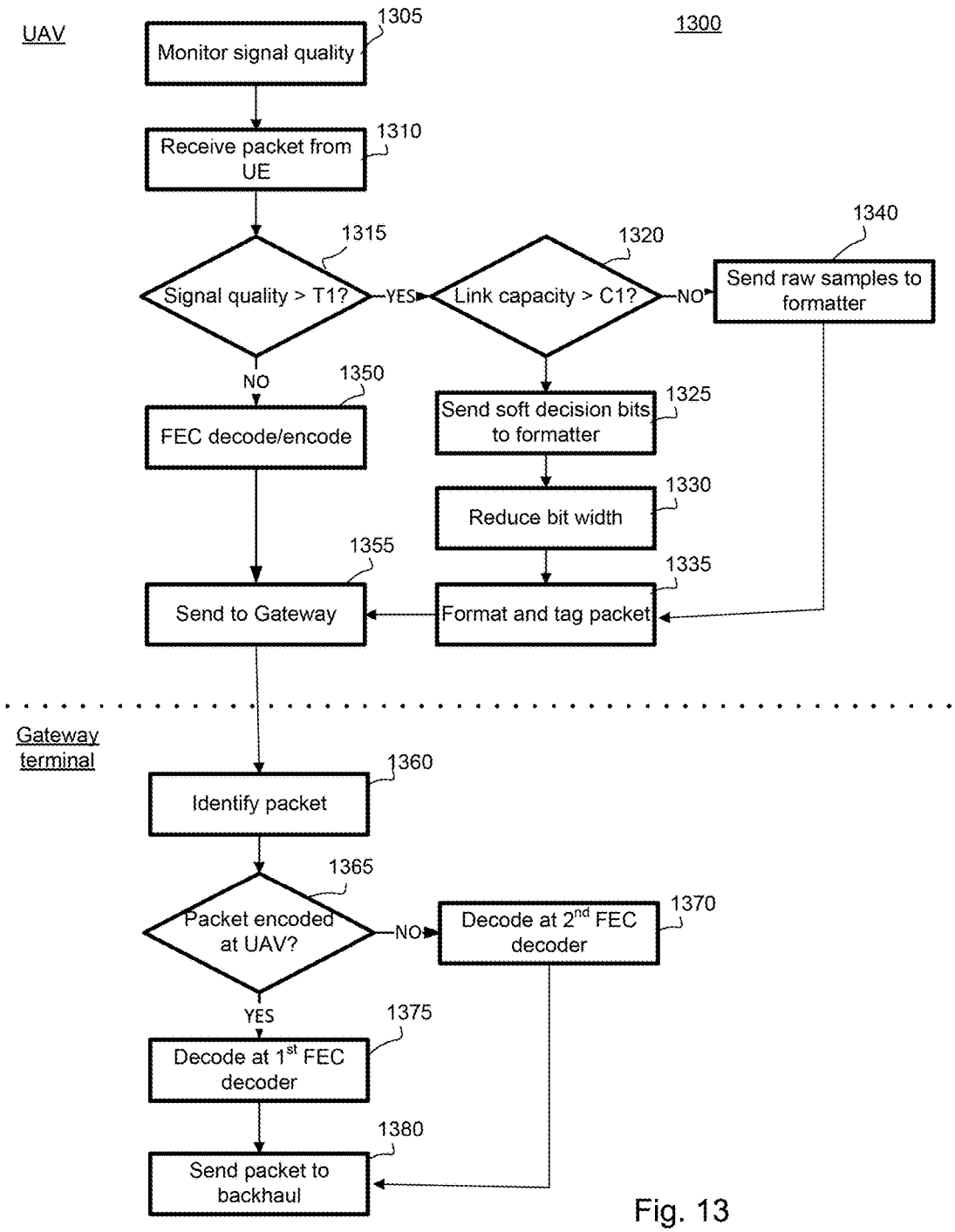
FIG. 13 is a flow diagram illustrating an example method of FEC bypass in a receive direction according to aspects of the disclosure.

FIG. 13 provides another flow diagram illustrating a method 1300 for sending packets in a receive direction. In block 1305, the UAV monitors signal quality. Similar to above, the monitoring may be continual, periodic, responsive to particular events, etc. In some examples, such monitoring may include receiving information from the gateway or other devices coupled to the UAV.

The UAV receives a packet from the end terminal (block 1310), and determines whether signal quality is greater than the predetermined threshold (block 1315). In some examples, the threshold set in the transmit direction may be different than the threshold set in the receive direction. If the signal quality is below the threshold, the UAV performs typical FEC decoding and encoding in block 1350. However, if the signal quality meets the threshold, the UAV may bypass FEC encoding/decoding and instead prepare the packet for processing by the gateway. For example, the UAV may determine whether a capacity of the link between the UAV and the gateway is above a capacity threshold. If not, a modem in the UAV sends raw samples to a formatter (block 1340). If the gateway link has sufficient capacity, however, the modem sends soft decision bits (block 1325). These soft decision bits may be sent through a bit width reducer (block 1330) prior to being sent to the formatter and tagger (block 1335).

In block 1355 the packet is sent to the gateway. The gateway may identify the packet in block 1360 and determine, based on the identification, whether the packet was encoded at the UAV or not (block 1365). If it was, regular FEC decoding may be performed by a first FEC decoder in block 1375. However, if FEC decoding/encoding was bypassed at the UAV, the packet may be sent to a second decoder (block 1370) for FEC decoding. The decoded packet is sent to backhaul at block 1380.

While the above examples are described primarily in relation to UAVs, the power saving techniques described may be implemented in any of a variety of systems where the relay node is located at a remote location with limited power. For example, such techniques may be implemented in a satellite, a UAV, a terrestrial site that is power limited, or any other communication system.

Because power consumption of a communications payload determines a number of users that can be supported on the UAV, conserving power in the UAV using FEC bypass, when available, results in an increased number of users. The number of users directly translates to the total revenue generated by the UAV. Moreover, a lower power payload could reduce the size of the UAV needed to reach a given set of users.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of improving communications, comprising:
   receiving a first packet at a gateway communicatively coupled to an end terminal through an unmanned air vehicle (UAV), wherein a first wireless link communicatively couples the gateway to the UAV, and a second wireless link communicatively couples the UAV to the end terminal;
   determining, with one or more processors, a signal quality on at least the first link between the gateway and the UAV in a first direction;
   when the signal quality exceeds a first predetermined threshold:
     encoding, at the gateway, the first received packet for processing by the end terminal;
     tagging the first received packet with an indicator to bypass forward error correction (FEC) at the UAV;
     monitoring, with the one or more processors at the gateway, the signal quality on at least the first link;
     comparing the monitored signal quality to a second threshold lower than the first threshold; and
     when the monitored signal quality falls below the second threshold lower, encoding, at the gateway, the first received packets for processing by the UAV.

2. The method of claim 1, further comprising:
   receiving, at the gateway, a second packet from the UAV, the second packet originating from the end terminal;
   determining, with the one or more processors, whether the second packet was FEC decoded and encoded at the UAV; and
   when it is determined that the second packet was not FEC decoded and encoded at the UAV, decoding the second packet at the gateway using end terminal modem processing.

3. The method of claim 1, wherein determining the signal quality comprises determining an aggregate signal quality on the first link and the second link.

4. The method of claim 1, wherein determining the signal quality comprises computing at least one of signal strength, frame error rate, and bit error rate.

5. The method of claim 1, wherein tagging the received packet further comprises indicating a particular user link on which the UAV is to transmit the received packet to the end terminal.

6. The method of claim 1, further comprising
   continuing encoding and tagging packets for FEC bypass at the UAV until the monitored signal quality falls below the second threshold.

7. A gateway, comprising:
   an interface configured to be communicatively coupled with an unmanned air vehicle (UAV) over a first link and with at least one end terminal over a second link between the UAV and the at least one end terminal;
   at least one forward error correction (FEC) encoder configured to be interfaced with a backhaul and to receive a first packet from the backhaul;
   a formatting unit coupled to the FEC encoder; and
   a controller communicatively coupled to the at least one FEC encoder and the formatting unit;
   wherein the controller is configured to determine whether a signal quality over the first link exceeds a first predetermined threshold;
   wherein when the signal quality is determined to exceed the first predetermined threshold, the gateway switches from a first mode with the first received packet encoded for decoding by the UAV to a second mode, wherein in the second mode:
the at least one FEC encoder is configured to encode the received first packet for processing by the end terminal; and
the formatting unit is configured to tag the received first packet with an indicator to bypass FEC at the UAV; and
wherein:
when the gateway is in the second mode, the gateway monitors whether the signal quality falls below a second threshold lower than the first threshold; and
when the signal quality falls below the second threshold, the gateway switches back to the first mode, wherein the first received packet is encoded for decoding by the UAV.

8. The gateway of claim 7, wherein the formatting unit is further configured to identify a particular end terminal link, from a plurality of end terminal links between the UAV and a plurality of end terminals, over which the first packet should be sent.

9. The gateway of claim 8, wherein in tagging the first packet and in identifying the particular end terminal link, the formatting unit modifies a header of the first packet.

10. The gateway of claim 7, wherein the signal quality is computed based on both the first link and the second link.

11. The gateway of claim 10, wherein the signal quality is computed as a function of at least one of signal strength, bit error rate, and frame error rate.

12. The gateway of claim 7, wherein:
the interface is configured to receive at least one second packet from the UAV over the first link;
the formatting unit is configured to determine whether the second packet was decoded and encoded at the UAV; and
the controller is configured to select one of a first decoder and a second decoder for decoding the second packet based on the determination by the formatting unit.

13. The gateway of claim 7, wherein the gateway remains in the second mode until the monitored signal quality falls below the second threshold.

14. An unmanned air vehicle (UAV), comprising:
a first interface configured for receiving a first packet from a gateway communicatively coupled to the UAV via a first wireless link;
a second interface configured for receiving a second packet from an end terminal communicatively coupled to the UAV via a second wireless link;
a forward error correction (FEC) encoder coupled between the first interface and the second interface;
a FEC decoder coupled between the first interface and the second interface;
a bypass link coupled between the first interface and the second interface and bypassing the FEC encoder and the FEC decoder; and
a controller in communication with at least the first interface and the second interface, the controller configured to:
determine whether the first packet has been encoded for end terminal processing; and
cause the first packet to be sent on the bypass link when it has been determined that the first packet has been encoded for end terminal processing.

15. The UAV of claim 14, wherein the controller is further configured to:
determine a signal quality over at least one of the first and second wireless links; and
if the signal quality exceeds a predetermined threshold, cause the second packet to be sent on the bypass link.

16. The UAV of claim 15, wherein determining the signal quality comprises computing an indicator based on at least one of signal strength, bit error rate, and frame error rate.

17. The UAV of claim 15, further comprising a formatting unit programmed to format the first packet for FEC decoding at the gateway when the first packet is sent on the bypass link.

18. The UAV of claim 17, wherein the controller is further configured to:
determine a capacity of the first wireless link; and
if the capacity exceeds a predetermined capacity threshold, send soft decision bits of the packet to the formatting unit.

19. The UAV of claim 18, further comprising a bit width reducer coupled between the second interface and the formatting unit, the bit width reducer configured to reduce a width of the soft decision bits.

20. The UAV of claim 18, wherein if the capacity of the second wireless link does not exceed the capacity threshold, the controller is configured to send raw samples to the formatting unit.

* * * * *